(12) United States Patent
Nakajima et al.

(10) Patent No.: US 9,352,993 B2
(45) Date of Patent: May 31, 2016

(54) METHOD OF OPERATING STEAM BOILER

(75) Inventors: Junichi Nakajima, Matsuyama (JP);
Junichi Kato, Matsuyama (JP);
Hiroyuki Mitsumoto, Matsuyama (JP);
Yoshiro Kaminokado, Matsuyama (JP);
Takashi Ninomiya, Matsuyama (JP)

(73) Assignee: MIURA CO., LTD., Matsuyama-shi (JP)

(*) Notice: Subject to any disclaimer, the term of this patent is extended or adjusted under 35 U.S.C. 154(b) by 454 days.

(21) Appl. No.: 13/049,493

(22) Filed: Mar. 16, 2011

(65) Prior Publication Data

US 2012/0000434 A1 Jan. 5, 2012

(30) Foreign Application Priority Data

Jun. 30, 2010 (JP) .................................. 2010-148863

(51) Int. Cl.
| | | |
|---|---|---|
| *F22B 37/48* | (2006.01) | |
| *C02F 5/08* | (2006.01) | |
| *C02F 5/00* | (2006.01) | |
| *C02F 5/12* | (2006.01) | |
| *C23F 14/02* | (2006.01) | |
| *F22B 1/18* | (2006.01) | |
| *C02F 1/50* | (2006.01) | |
| *C01D 1/04* | (2006.01) | |
| *C01B 33/113* | (2006.01) | |
| *H04N 1/387* | (2006.01) | |
| *H04N 1/04* | (2006.01) | |
| *F22B 35/10* | (2006.01) | |

(52) U.S. Cl.
CPC ............... *C02F 5/125* (2013.01); *F22B 35/10* (2013.01); *F22B 37/48* (2013.01); *C02F 2209/06* (2013.01); *C02F 2303/08* (2013.01)

(58) Field of Classification Search
None
See application file for complete search history.

(56) References Cited

U.S. PATENT DOCUMENTS 1,903,041 A * 3/1933 Hall et al. ............... 210/697
1,942,861 A * 1/1934 Huster ..................... 122/1 B
(Continued)

FOREIGN PATENT DOCUMENTS

| CN | 1837682 A | 9/2006 |
| CN | 101184955 A | 5/2008 |

(Continued)

OTHER PUBLICATIONS

Betz Handbook of Industrial Water Conditioning, Betz Laboratories, Inc., 8th Edition, 1980, pp. 91-94, Trevose, PA, U.S.A.

(Continued)

*Primary Examiner* — Gregory Huson
*Assistant Examiner* — Eric Gorman
(74) *Attorney, Agent, or Firm* — Fox Rothschild LLP

(57) ABSTRACT

Boiler water is heated in a steam boiler while feed water, which has a hardness of 5 mg $CaCO_3$/L or less and is used as the boiler water, is supplied to the steam boiler. A part of the boiler water is appropriately disposed of. A chemical aqueous solution containing an alkaline metal silicate, an alkaline metal hydroxide and at least one kind of scale preventive agents of ethylenediamine tetraacetate, and its alkaline metal salt, is supplied to the feed water so that a concentration of the scale preventive agent is at least 1.5 mol equivalent times relative to the hardness of the feed water. In the steam boiler, a condensation rate of the boiler water is set so that the concentration of the scale preventive agent in the boiler water is 40 mg EDTA/L or less.

4 Claims, 5 Drawing Sheets

(56) References Cited

U.S. PATENT DOCUMENTS

| | | | | |
|---|---|---|---|---|
| 2,234,786 | A * | 3/1941 | Walsh | 210/724 |
| 2,838,449 | A * | 6/1958 | Briggs | 210/665 |
| 3,259,179 | A * | 7/1966 | Leach | 165/95 |
| 3,261,765 | A * | 7/1966 | Spray | 203/7 |
| 3,298,359 | A * | 1/1967 | West et al. | 122/379 |
| 3,356,073 | A * | 12/1967 | Bloom | 122/379 |
| 3,414,507 | A * | 12/1968 | Calmon | 210/673 |
| 3,563,210 | A * | 2/1971 | Hoogendam | 122/1 B |
| 3,581,714 | A * | 6/1971 | Smith | 122/1 R |
| 3,939,100 | A * | 2/1976 | Hau et al. | 510/348 |
| 4,003,786 | A * | 1/1977 | Cahn | 376/322 |
| 4,025,308 | A * | 5/1977 | Holman et al. | 436/125 |
| 4,072,625 | A * | 2/1978 | Pinto | 48/198.3 |
| 4,125,593 | A * | 11/1978 | Scheifley et al. | 588/321 |
| 4,126,549 | A * | 11/1978 | Jones et al. | 210/701 |
| 4,186,181 | A * | 1/1980 | Giammarco et al. | 423/650 |
| 4,198,378 | A * | 4/1980 | Giammarco et al. | 423/220 |
| 4,282,070 | A * | 8/1981 | Egosi | 203/11 |
| 4,454,427 | A * | 6/1984 | Sosnowski et al. | 290/2 |
| 4,465,579 | A * | 8/1984 | Mataga | C25B 9/206 204/255 |
| 4,705,936 | A * | 11/1987 | Fowler | 392/326 |
| 4,713,195 | A * | 12/1987 | Schneider | 252/180 |
| 4,721,532 | A * | 1/1988 | Kuhn et al. | 134/3 |
| 4,857,622 | A * | 8/1989 | Bousquet et al. | 526/317.1 |
| 4,911,856 | A * | 3/1990 | Lokkesmoe et al. | 510/221 |
| 4,971,714 | A * | 11/1990 | Lokkesmoe et al. | 510/222 |
| 4,978,456 | A * | 12/1990 | Sprague | 210/699 |
| 5,021,096 | A * | 6/1991 | Abadi | 134/22.14 |
| 5,024,783 | A * | 6/1991 | Busch et al. | 510/247 |
| 5,053,161 | A * | 10/1991 | Sprague | 252/180 |
| 5,183,573 | A * | 2/1993 | Kreh et al. | 210/697 |
| 5,213,691 | A * | 5/1993 | Emmons et al. | 210/700 |
| 5,229,029 | A * | 7/1993 | Colombo | 252/180 |
| 5,236,845 | A * | 8/1993 | Pierce et al. | 436/6 |
| 5,339,621 | A * | 8/1994 | Tolman | 60/783 |
| 5,348,588 | A * | 9/1994 | Winston | 134/10 |
| 5,616,307 | A * | 4/1997 | Dubin et al. | 423/235 |
| 5,747,342 | A * | 5/1998 | Zupanovich | 436/55 |
| 5,938,900 | A * | 8/1999 | Reynolds | 210/192 |
| 5,948,267 | A * | 9/1999 | Whittemore et al. | 210/698 |
| 6,040,406 | A * | 3/2000 | Carrier et al. | 526/238.22 |
| 6,042,742 | A * | 3/2000 | Whittemore et al. | 252/180 |
| 6,071,413 | A * | 6/2000 | Dyke | 210/651 |
| 6,120,698 | A * | 9/2000 | Rounds et al. | 252/181 |
| 6,149,821 | A * | 11/2000 | Rounds et al. | 210/754 |
| 6,190,611 | B1 * | 2/2001 | Tachino et al. | 422/430 |
| 6,241,893 | B1 * | 6/2001 | Levy | 210/660 |
| 6,461,514 | B1 * | 10/2002 | Al-Samadi | 210/652 |
| 6,514,406 | B1 * | 2/2003 | Katehis | 210/175 |
| 6,599,748 | B1 * | 7/2003 | Nakajima et al. | 436/39 |
| 6,655,322 | B1 * | 12/2003 | Godwin et al. | 122/379 |
| 6,833,032 | B1 * | 12/2004 | Douglas et al. | 134/3 |
| 7,202,090 | B2 * | 4/2007 | Mitsumoto | 436/73 |
| 7,588,696 | B2 * | 9/2009 | Koefod | 252/175 |
| 8,034,756 | B2 * | 10/2011 | Crump et al. | 510/247 |
| 8,092,656 | B2 * | 1/2012 | Minnich et al. | 203/10 |
| 2001/0027219 | A1 * | 10/2001 | Holcomb | B01D 61/025 516/98 |
| 2003/0004081 | A1 * | 1/2003 | Ellis et al. | 510/247 |
| 2003/0086820 | A1 * | 5/2003 | McDonnell et al. | 422/28 |
| 2003/0108462 | A1 * | 6/2003 | Oskoui | B09C 1/02 423/27 |
| 2003/0124730 | A1 * | 7/2003 | Bailey et al. | 436/172 |
| 2004/0127660 | A1 * | 7/2004 | Fukuhara et al. | 526/240 |
| 2004/0245085 | A1 * | 12/2004 | Srinivasan | 204/157.15 |
| 2004/0245177 | A1 * | 12/2004 | Pipes | 210/641 |
| 2005/0106118 | A1 * | 5/2005 | Sakuma et al. | 424/70.24 |
| 2006/0214015 | A1 | 9/2006 | Furukawa et al. | |
| 2007/0015678 | A1 * | 1/2007 | Rodrigues et al. | 510/320 |
| 2007/0095759 | A1 * | 5/2007 | Bridle | 210/687 |
| 2007/0138109 | A1 * | 6/2007 | Tufano et al. | 210/748 |
| 2007/0227978 | A1 * | 10/2007 | Mitsumoto | 210/698 |
| 2007/0231920 | A1 * | 10/2007 | Mitsumoto | 436/163 |
| 2008/0000098 | A1 * | 1/2008 | Choi et al. | 34/114 |
| 2008/0023030 | A1 * | 1/2008 | Dooley et al. | 134/4 |
| 2008/0075987 | A1 * | 3/2008 | Kindler et al. | 429/17 |
| 2008/0110630 | A1 * | 5/2008 | Minnich et al. | 166/303 |
| 2008/0163832 | A1 | 7/2008 | Kume | |
| 2008/0189992 | A1 * | 8/2008 | Valiyambath Krishnan et al. | 38/75 |
| 2008/0290033 | A1 * | 11/2008 | Kimball et al. | 210/652 |
| 2008/0317447 | A1 * | 12/2008 | Lentz et al. | 392/326 |
| 2009/0021010 | A1 * | 1/2009 | Walker | 290/2 |
| 2009/0130000 | A1 * | 5/2009 | Inoue | 422/197 |
| 2009/0211983 | A1 * | 8/2009 | Keister | 210/668 |
| 2009/0235553 | A1 * | 9/2009 | Bae et al. | 34/524 |
| 2009/0261039 | A1 * | 10/2009 | Paillard et al. | 210/638 |
| 2010/0016198 | A1 * | 1/2010 | Bernhardt et al. | 510/127 |
| 2010/0025333 | A1 * | 2/2010 | Owens | 210/666 |
| 2010/0243569 | A1 * | 9/2010 | Nakajima | 210/664 |
| 2010/0263689 | A1 * | 10/2010 | Monsrud et al. | 134/18 |
| 2011/0021403 | A1 * | 1/2011 | Miralles et al. | 510/219 |
| 2011/0067600 | A1 * | 3/2011 | Constantz et al. | 106/640 |
| 2011/0077144 | A1 * | 3/2011 | Jessen et al. | 502/25 |
| 2012/0125864 | A1 * | 5/2012 | Richardson et al. | 210/737 |
| 2013/0192637 | A1 * | 8/2013 | Everson et al. | 134/10 |
| 2014/0008208 | A1 * | 1/2014 | Pichach | 203/1 |
| 2014/0042075 | A1 * | 2/2014 | Ding et al. | 210/284 |

FOREIGN PATENT DOCUMENTS

| | | | | |
|---|---|---|---|---|
| DE | 19903128 A1 | * | 8/2000 | C07D 213/70 |
| JP | 09273705 A | * | 10/1997 | F22B 27/16 |
| JP | 2003-060886 | | 6/2003 | |
| JP | 2003-159597 A | | 6/2003 | |
| JP | 2010230183 A | * | 10/2010 | |

OTHER PUBLICATIONS

Chen Hong Xia, "A Study on High Efficiency Inhibitor in the Water Treatment of Boiler", Tianjin University, 2006.

* cited by examiner

METHOD OF OPERATING STEAM BOILER

INCORPORATION BY REFERENCE

This application claims priority to Japanese Patent Application No. 2010-148863 filed Jun. 30, 2010, the entire contents of which being hereby incorporated herein by reference.

BACKGROUND OF THE INVENTION

1. Field of the Invention

The present invention relates to a method of operating a steam boiler, and in particular, to a method of operating a steam boiler that generates steam by heating boiler water.

2. Description of Related Art

A general steam boiler apparatus for supplying steam to a loading device such as a heat exchanger has a water supply device to a steam boiler. The steam boiler generates steam by heating feed water from the water supply device as boiler water, and supplies this steam to the loading device through a steam path. Typically, the feed water supplied herein is softened water from which hardness components are removed by treating raw water such as tap water, industrial water or ground water with a water softening device. Therefore, in the steam boiler, generation of a scale that will lead inhibition of heat transfer in a heat transfer pipe or the like for heating boiler water is prevented, so that long-term economical operation can be realized.

The boiler water may lead progression of corrosion of a heat transfer pipe or the like of the steam boiler and lead occurrence of a defect such as boring in some cases due to dissolved oxygen or corrosive ions such as chloride ions and sulfate ions contained in the feed water, and due to pH outside the appropriate range (11 to 11.8 according to the low-pressure boiler standard of JIS 88223), in particular pH lower than the appropriate range of the boiler water. Therefore, in an operation of the steam boiler apparatus, a corrosion preventive agent is added to the feed water to prevent corrosion of a heat transfer pipe or the like. As the corrosion preventive agent, typically, a film forming agent and a pH modifier are used together for preventing corrosion caused by dissolved oxygen or corrosive ions, and for example, a composite corrosion preventive agent including an aqueous solution in which an alkaline metal silicate which is a film forming agent, and an alkaline metal hydroxide which is a pH modifier are mixed has been proposed. Since the boiler water in which the composite corrosion preventive agent is added to the feed water does not contain an organic compound, it can be disposed of safely to the environmental system without the need of considering the emission regulation of chemical oxygen demand (COD).

While the water softening device used in the steam boiler apparatus is able to remove hardness components (a magnesium ion and a calcium ion) in raw water by ion exchange using a cation exchange resin, it fails to remove silica contained in the raw water. Although silica contained in raw water alone is recognized as being unlikely to cause scale generation, it will be a cause of a scale because it easily binds with a hardness component to form a water-insoluble salt. Therefore, when a slight amount of leakage of a hardness component to the feed water occurs due to a defect of the water softening device, a scale mainly caused by silica can be generated in the steam boiler.

For addressing such leakage of the hardness component in the water softening device, typically, a scale preventive agent capable of preventing generation of a scale by chelating the hardness component is added together with a corrosion preventive agent, and as such a scale preventive agent, ethylenediamine tetraacetate or its alkaline metal salt is generally known.

Here, since ethylenediamine tetraacetate and its alkaline metal salt can lead an increase in COD of the boiler water because they are organic compounds, it is preferred to set its additive amount to the feed water to requisite minimum. In this respect, since a molar ratio between ethylenediamine tetraacetate or its alkaline metal salt and a hardness component in a complex of ethylenediamine tetraacetate or its alkaline metal salt and the hardness component is known to be 1:1, it is supposed from this finding that the additive amount of ethylenediamine tetraacetate or its alkaline metal salt is preferably set to an equivalent amount or an amount slightly larger than the equivalent amount to multivalent metal ions assumed to be contained in the feed water due to leakage from the water softening device.

However, even when the additive amount of ethylenediamine tetraacetate or its alkaline metal salt is set as described above, a scale actually arises in the steam boiler.

SUMMARY OF THE INVENTION

It is an object of the present invention to suppress the chemical oxygen demand of boiler water to 30 mg/L or less which is one of the environmental standards of discharge water specified by the water pollution control law and a more stringent effluent standard of each local government while preventing generation of a scale in a steam boiler.

The present invention relates to a method of operating a steam boiler generating steam by heating boiler water, and this operation method includes the step of heating the boiler water in the steam boiler while supplying feed water having a hardness of 5 mg $CaCO_3$/L or less used as the boiler water to the steam boiler and appropriately disposing of part of the boiler water, and the step of supplying a chemical aqueous liquid containing an alkaline metal silicate, an alkaline metal oxide and at least one kind of scale preventive agents of ethylenediamine tetraacetate and its alkaline metal salt to the feed water such that the concentration of the scale preventive agent is at least 1.5 mol equivalent times relative to the hardness of the feed water, wherein in the steam boiler, a condensation rate of the boiler water is set so that the concentration of the scale preventive agent in the boiler water is 40 mg EDTA/L or less.

The feed water used in this operation method is typically softened water obtained by treating tap water, industrial water or ground water with a cation exchange resin. The alkaline metal silicate is, for example, a reaction product of at least one kind of silicic acid and silicon dioxide, and an alkaline metal hydroxide.

Since the method of operating a steam boiler according to the present invention uses a specific chemical aqueous solution containing a scale preventive agent, and further controls the amount of the chemical aqueous solution added to the feed water based on the concentration of the scale preventive agent in the feed water, and controls the condensation rate of the boiler water so that the concentration of the scale preventive agent is adjusted to a predetermined value or less, it is possible to suppress the chemical oxygen demand of boiler water to 30 mg/L or less which is one of the environmental standards of discharge water specified by the water pollution control law and a more stringent effluent standard of each local government while preventing generation of a scale in the steam boiler.

DETAILED DESCRIPTION OF THE PREFERRED EMBODIMENTS

Figure 1:
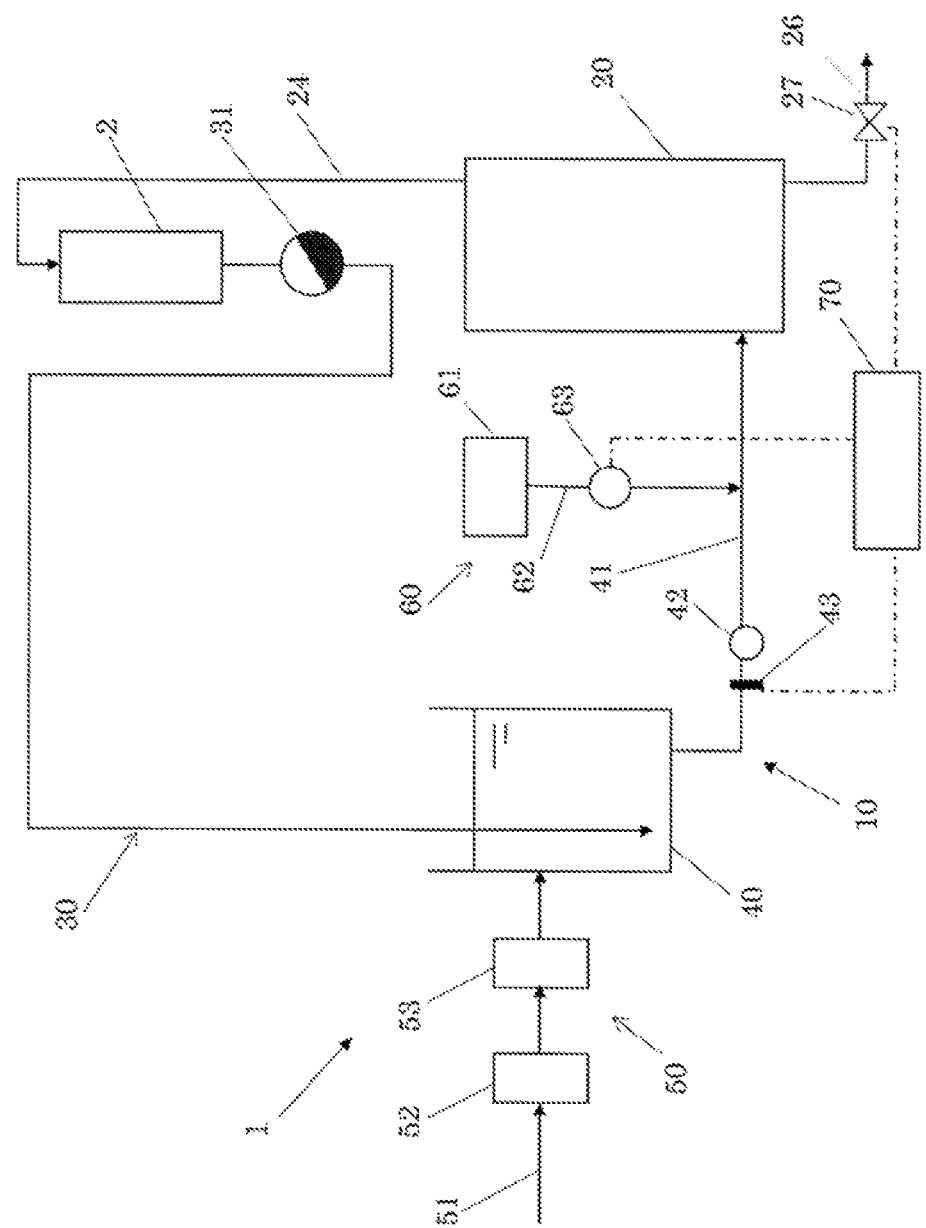
FIG. 1 is a schematic view of one embodiment of a steam boiler apparatus for which the operation method according to the present invention can be practiced.

Referring to FIG. 1, one embodiment of a steam boiler apparatus for which the operation method of the present invention can be practiced will be described. In FIG. 1, a steam boiler apparatus 1 is provided for supplying steam to a loading device 2 which is a facility using steam such as a heat exchanger, a boiler, a reboiler or an autoclave, and mainly has a water supply device 10, a steam boiler 20, a condensate piping 30, a chemical supply device 60 and a controller 70.

The water supply device 10 is provided for supplying feed water used as boiler water in the steam boiler 20, and mainly has a feed water tank 40, for reserving feed water, and a supplemental path 50 for supplying supplemental water used as feed water to the feed water tank. The feed water tank 40 has a water supply path 41 extending from its bottom part to the steam boiler 20. The water supply path 41 communicates with the steam boiler 20, and has a water supply pump 42 for sending out the feed water reserved in the feed water tank 40 to the steam boiler 20, and a sensor 43 for measuring the hardness of the feed water.

The supplemental path 50 has a water injection conduit 51. The water injection conduit 51 is provided for supplying supplemental water from a raw water tank (not shown) in which raw water supplied from a water source such as tap water, industrial water or ground water is reserved to the feed water tank 40, and has a water softening device 52 and a deoxygenation device 53 in this order toward the feed water tank 40.

The water softening device 52 is provided for treating the supplemental water from the raw water tank with a sodium form cation exchange resin to convert the supplemental water into softened water by replacing a calcium ion and a magnesium ion which are hardness components contained in the supplemental water into sodium ions.

The deoxygenation device 53 is provided for removing dissolved oxygen in the supplemental water treated in the water softening device 52, and typically various types such as a type of removing dissolved oxygen using a separation membrane, a type of removing dissolved oxygen by subjecting the treated water to a reduced pressure environment, or a type of removing dissolved oxygen by heating the treated water are used.

Figure 2:
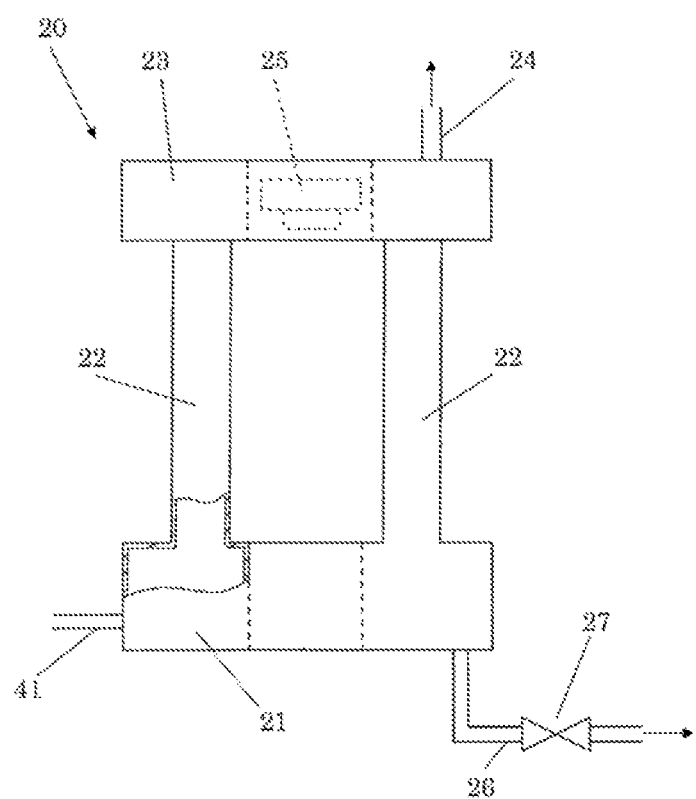
FIG. 2 is a partial sectional schematic view of a steam boiler used in the steam boiler apparatus.

The steam boiler 20 is a once-through boiler, and mainly has, as shown in FIG. 2, a ring-shaped reservoir portion 21 capable of reserving feed water supplied from the water supply path 41, a plurality of heat transfer pipes 22 standing up from the reservoir portion 21 (in FIG. 2, only two pipes are shown), a ring-shaped header 23 disposed in the upper end part of the heat transfer pipe 22, a steam supply piping 24 extending from the header 23 to the loading device 2, a combustion device 25 such as a burner, and a blow path 26.

The heat transfer pipe 22 is formed by using a nonpassivated metal. The nonpassivated metal refers to a metal that will not be naturally passivated in a neutral aqueous solution, and typically a metal excluding stainless steel, titanium, aluminum, chromium, nickel, zirconium and the like. Concrete examples include carbon steel, cast iron, copper and a copper alloy. Although carbon steel may be passivated in the presence of high concentration of chromate ions even in a neutral aqueous solution in some cases, this passivation is caused by the influence of chromate ions, and is hard to be said to be normal passivation in a neutral aqueous solution. Therefore, carbon steel belongs to the category of a nonpassivated metal used herein. Although copper and a copper alloy are typically regarded as metals in which corrosion by the influence of moisture is unlikely to occur because they are in "rare" positions in electrochemical series (emf series), they belong to the category of a nonpassivated metal because they will not be naturally passivated in a neutral aqueous solution.

The combustion device 25 is provided for heating the heat transfer pipe 22 by radiating a combustion gas in the direction of the reservoir portion 21 from the side of the header 23. The blow path 26 has a control valve 27 and is able to dispose of part of the boiler water by opening/closing the control valve 27.

The condensate piping 30 extends from the loading device 2 to the feed water tank 40, and has a steam trap 31. The steam trap 31 is provided for separating steam and condensed water. Typically, the condensate piping 30 is preferably disposed in the vicinity of the bottom part of the feed water tank 40 so that its tip end part is disposed in the feed water for preventing air from being involved into the feed water reserved in the feed water tank 40. The condensate piping 30 is formed by using a nonpassivated metal likewise the heat transfer pipe 22 of the steam boiler 20.

The chemical supply device 60 is provided for supplying a chemical to the feed water supplied to the steam boiler 20 from the feed water tank 40. The chemical supply device 60 has a chemical tank 61 for reserving a chemical, a supply path 62 extending from the chemical tank 61 to the water supply path 41, and a supply pump 63 disposed in the supply path 62. The supply pump 63 sends out the chemical reserved in the chemical tank 61 to the water supply path 41 through the supply path 62, and is able to control the flow rate.

The controller 70 is provided mainly for controlling the supply pump 63 of the chemical supply device 60 and the control valve 27 of the blow path 26, and is set so that hardness information or the like of feed water measured in the sensor 43 is inputted to its input side, and an operation instruction to the supply pump 63, the control valve 27 and the like is outputted from its output side.

The chemical reserved in the chemical tank 61 of the chemical supply device 60 is provided for preventing corrosion and occurrence of a scale in the steam boiler 20, and in particular, for preventing corrosion and occurrence of a scale in the heat transfer pipe 22, and is an aqueous solution of an alkaline metal silicate, an alkaline metal hydroxide and a scale preventive agent dissolved in purified water such as distilled water.

The alkaline metal silicate used in this chemical aqueous solution is a compound represented by the general formula of $M_2O \cdot nSiO_2$, wherein M represents an alkaline metal (typically potassium or sodium), and n represents a numerical value from 0.5 to 4. The alkaline metal silicate forms a film on the contact face of boiler water, in particular, on the inner face of the heat transfer pipe 22 in the steam boiler 20, and is able to prevent corrosion of the heal transfer pipe 22 by this film.

Examples of the alkaline metal silicate used herein include sodium silicates such as sodium metasilicate (in the formula, M is sodium and n is 1), sodium orthosilicate (in the formula, M is sodium and n is 0.5) and sodium polysilicate (in the formula, M is sodium and n is 2 to 3) and potassium silicates such as potassium metasilicate (in the formula, M is potassium and n is 1), potassium orthosilicate (in the formula, M is potassium and n is 0.5) and potassium polysilicate (in the formula, M is potassium and n is 2 to 3). Two or more kinds of the alkaline metal silicates may be used together. The alkaline metal silicate may be prepared by dissolving at least one of silicic acid and silicon dioxide and an alkaline metal hydroxide in the chemical aqueous solution, and allowing them to react with each other. The silicic acid used for this purpose is typically metasilicic acid, orthosilicic acid or the like, and the alkaline metal hydroxide is typically sodium hydroxide, potassium hydroxide or the like. In this case, two or more kinds of the alkaline metal silicates may be prepared by combining several kinds of the silicic acid, silicon dioxide and alkaline metal hydroxide.

Typically, the concentration of the alkaline metal silicate in the chemical aqueous solution is preferably set to 0.01 to 60% by weight, and more preferably 0.1 to 55% by weight in consideration of the solubility of the alkaline metal silicate, the viscosity of the chemical aqueous solution and the corrosion preventive effect of the chemical aqueous solution diluted with feed water and the like.

The alkaline metal hydroxide used in the chemical aqueous solution is typically sodium hydroxide or potassium hydroxide. The alkaline metal hydroxide prevents corrosion of the steam boiler 20, and in particular, its heat transfer pipe 22 by adjusting the pH of the boiler water to alkaline side. The concentration of the alkaline metal hydroxide in the chemical aqueous solution is typically set to preferably 0.1 to 30% by weight, and more preferably to 1 to 10% by weight in consideration of the pH elevation effect of the chemical aqueous solution diluted with feed water and the like. When the alkaline metal silicate used in the chemical aqueous solution is prepared by the reaction between silicic acid or silicon dioxide and an alkaline metal hydroxide, the above concentration of the alkaline metal hydroxide is such a concentration after deduction of the amount of the alkaline metal hydroxide used for the preparation.

The scale preventive agent used in the chemical aqueous solution is at least one kind of ethylenediamine tetraacetate (EDTA) and its alkaline metal salt. This scale preventive agent is able to keep the state where a hardness component is dissolved in the boiler water by chelating the hardness component contained in the feed water, and thus is able to prevent generation of a scale in the heat transfer pipe 22 of the steam boiler 20.

The alkaline metal salt of ethylenediamine tetraacetate used as the scale preventive agent is such that at least one of four carboxyl groups in the ethylenediamine tetraacetate forms an alkaline metal salt, and the alkaline metal forming this salt is typically sodium or potassium. Examples of the alkaline metal salt of ethylenediamine tetraacetate include disodium ethylenediamine tetraacetate, tetrasodium ethylenediamine tetraacetate, dipotassium ethylenediamine tetraacetate and tetrapotassium ethylenediamine tetraacetate.

Typically, the concentration of the scale preventive agent in the chemical aqueous solution is preferably set o 0.1 to 50% by weight, and more preferably 1 to 30% by weight in consideration of mol equivalent ratio relative to the hardness of the feed water and a supply amount of the chemical aqueous solution and the like.

Next, a method of operating the above-described steam boiler apparatus 1 will be described.

In the operation of the steam boiler apparatus 1, supplemental water is first supplied from the raw water tank to the feed water tank 40 through the water injection conduit 51, and the supplemental water is reserved in the feed water tank 40 as boiler feed water.

At this time, the supplemental water from the raw water tank is first treated in the water softening device 52 to remove hardness components, to be converted into softened water. As a result, the hardness of the supplemental water is typically adjusted to 5 mg $CaCO_3$/L or less, and particularly a trace amount of 1 mg $CaCO_3$/L or less. The supplemental water converted into softened water in the water softening device 52 is then subjected to a deoxygenation treatment in the deoxygenation device 53. As a result, from the supplemental water, dissolved oxygen that will promote corrosion of the heat transfer pipe 22 or the like in the steam boiler 20 is removed. As a result, in the feed water tank 40, softened water having a hardness of 5 mg $CaCO_3$/L or less, particularly 1 mg $CaCO_3$/L or less and having subjected to the deoxygenation treatment is reserved as feed water to the steam boiler 20.

When the water supply pump 42 is actuated in the state where supplemental water is reserved in the feed water tank 40, the supplemental water reserved in the feed water tank 40, namely the feed water is supplied to the steam boiler 20 through the water supply path 41. The feed water supplied to the steam boiler 20 is reserved in the reservoir portion 21 as boiler water. This boiler water rises up in each heat transfer pipe 22 while it is heated by the combustion device 25 through each heat transfer pipe 22 and gradually turns into steam. Then the steam generated in each heat transfer pipe 22 is collected in the header 23, and supplied to the loading device 2 through the steam supply piping 24. By such generation of steam, condensation of the boiler water proceeds.

The steam supplied to the loading device 2 passes through the loading device 2 and flows into the condensate piping 30, where the steam looses latent heat and part of the steam turns into condensed water, and the steam and the condensed water are separated from each other in the steam trap 31 to generate condensate of high temperature. The condensate generated in this manner is recovered into the feed water tank 40 through the condensate piping 30 and mixed with the reserved supplemental water, and reused as feed water. At this time, since the feed water reserved in the feed water tank 40 is heated by the condensate of high temperature, heating load in the steam boiler 20 is lessened.

During the operation as described above, the steam boiler apparatus 1 supplies a chemical aqueous solution from the chemical supply device 60 to the feed water flowing through the water supply path 41 into the steam boiler 20. At this time, the controller 70 actuates the supply pump 63 based on the hardness information from the sensor 43 and the flow rate of the feed water, and the concentrations of individual components in the chemical aqueous solution, (especially, the concentration of the scale preventive agent), and controls the supply amount of the chemical aqueous solution to the feed water. Concretely, the supply amount of the chemical aqueous solution from the chemical tank 61 to the water supply path 41 is controlled so that the concentration of the scale preventive agent in the feed water is at least 1.5 mol equivalent times relative to the hardness of the feed water measured by the sensor 43 (at least 1.5 times mol of the mol number of the hardness of the feed water). When the concentration of the scale preventive agent in the feed water is less than 1.5 mol equivalent times relative to the hardness, a scale is more likely to be generated in the heat transfer pipe 22 of the steam boiler 20 as a result of generation of a water-insoluble salt between a hardness component remaining in the feed water due to a hardness leakage in the water softening device 52 and a carbonate ion generated from a hydrogen carbonate ion contained in the feed water by heat decomposition, or generation of a water-insoluble salt between the hardness component and silica contained in the feed water.

In a complex between ethylenediamine tetraacetate or its alkaline metal salt which is a scale preventive agent, and a hardness component, it is known that a molar ratio between the ethylenediamine tetraacetate or its alkaline metal salt and the hardness component is 1:1, and as a reason why a scale is likely to be generated if the concentration of the scale preventive agent in the feed water is less than 1.5 mol equivalent times even when it is equivalent to the hardness, the following can be conceived.

(1) Since boiler water will undergo highly alkaline and high temperature, the tertiary structure of the scale preventive agent is in a freely deformable state under high temperature, and on the other hand, under the highly alkaline condition, the tertiary structure of the scale preventive agent can be solidified by electric repulsion between minus electric charges in the molecule of the scale preventive agent. Due to compensation of these effects, it is supposed that the scale preventive agent forming a chelate with the hardness component can partially form two molecules.

(2) There is a possibility that the scale preventive agent is decomposed by heating in the boiler water of high temperature, and the concentration of the scale preventive agent in the boiler water decreases more than expected.

(3) There is a possibility that formation of a complex between the hardness component and the scale preventive agent is suppressed in the boiler water of high temperature and high alkaline.

During the operation of the steam boiler apparatus 1, the condensation rate of the boiler water is set so that the concentration of the scale preventive agent in the boiler water is 40 mg EDTA/L or less in the steam boiler 20. Here, the controller 70 determines the concentration of the scale preventive agent in the feed water based on the amount of the chemical aqueous solution supplied to the feed water and the like. Then, the controller 70 disposes of part of the boiler water by appropriately opening/closing the control valve 27 of the blow path 26 so that the concentration of the scale preventive agent is 40 mg EDTA/L or less in the boiler water, and thus adjusts the condensation rate of the boiler water. When an alkaline metal salt of ethylenediamine tetraacetate is used as the scale preventive agent, the concentration is a concentration in terms of ethylenediamine tetraacetate.

In the operation method of the present invention, since the chemical aqueous solution is added to the feed water so that the concentration of the scale preventive agent in the feed water is at least 1.5 mol equivalent times relative to the hardness of the feed water, it is possible to prevent generation of a scale in the steam boiler 20 effectively. Also, in the steam boiler 20, since the condensation rate of the boiler water is set so that the concentration of the scale preventive agent in the boiler water is 40 mg EDTA/L or less, it is possible to suppress the chemical oxygen demand of the boiler water disposed of as blow water to 30 mg/L or less which is one of the environmental standards of discharge water specified by the water pollution control law and a more stringent effluent standard of each local government. The chemical oxygen demand used herein is determined by a measurement method using potassium permanganate as an oxidizing agent, and generally represented by $COD_{Mn}$.

When the hardness of the feed water exceeds 5 mg $CaCO_3$/L, it is necessary to supply a large amount of the chemical aqueous solution to the feed water for preventing a scale. Therefore, it is difficult to control the concentration of the scale preventive agent in the boiler water to 40 mg EDTA/L or less.

EXAMPLE

Preparation of Formula Water 1

Tap water in Matsuyama, Ehime prefecture, Japan was supplied into a mixed bed water purification system, and ion exchange water having an electric conductivity of 0.2 mS/m or less was obtained. To this ion exchange water were added sodium chloride (special grade reagent), sodium hydrogen carbonate (special grade reagent), sodium sulfate (special grade reagent), sodium silicate (Practical Grade) and calcium chloride (special grade reagent) to prepare Formula water 1 having the following water quality. Because the pH of the formula water was alkaline when only these reagents were added to the ion exchange water, parts of sodium chloride and sodium sulfate were replaced with hydrochloric acid (special grade reagent) and sulfuric acid (special grade reagent), respectively, to adjust the pH of Formula water 1 to near neutral. As individual reagents, products manufactured by Wako Pure Chemical Industries, Ltd. were directly used.
<Water Quality>
Hardness ($Ca^{2+}$): 5 mg $CaCO_3$/L
Acid consumption (pH 4.8): 30 mg $CaCO_3$/L
Silica: 60 mg $SiO_2$/L
Chloride ion: 5 mg $Cl^-$/L
Sulfate ion: 5 mg $SO_4^{2-}$/L
(Preparation of Formula Water 2)

In preparation of Formula water 1, disodium ethylenediamine tetraacetate (EDTA-2Na: special grade reagent manufactured by Wako Pure Chemical Industries, Ltd.) was additionally added, to prepare Formula water 2 having a concentration in terms of ethylenediamine tetraacetate (hereinafter, referred to as "concentration in terms of EDTA") of 7.5 mg/L.
(Preparation of Formula Water 3)

In preparation of Formula water 1, disodium ethylenediamine tetraacetate (EDTA-2Na: special grade reagent manufactured by Wako Pure Chemical Industries, Ltd.) was additionally added, to prepare Formula water 3 having a concentration in terms of EDTA of 15 mg/L.
(Fabrication of Simulated Steam Boiler Apparatus)

Figure 3:
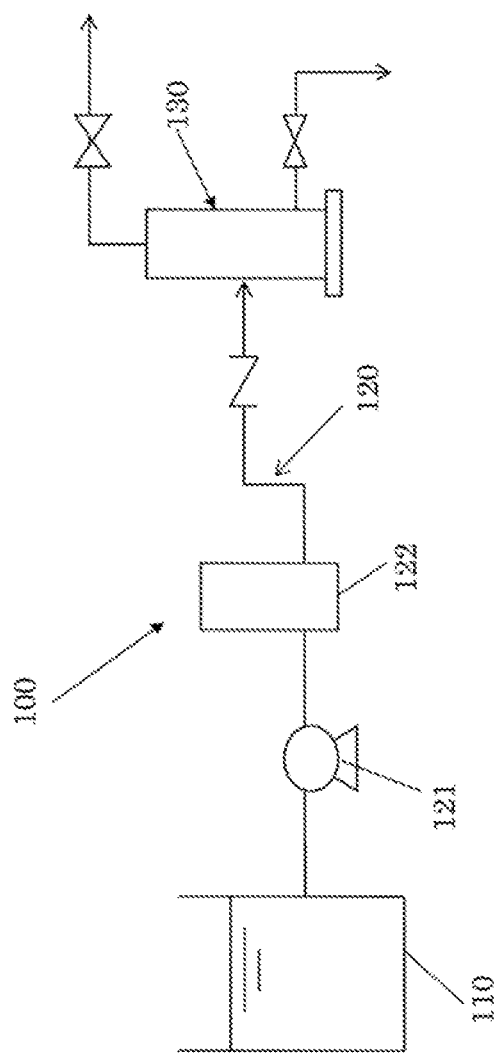
FIG. 3 is a schematic view of a simulated steam boiler used in example.

A simulated steam boiler apparatus shown in FIG. 3 was fabricated. In the figure, a simulated steam boiler apparatus 100 mainly has a feed water tank 110, a water supply path 120 and a simulated steam boiler 130. The feed water tank 110 is made of SUS304, and is provided for reserving formula water. The water supply path 120 is a path for supplying the formula water reserved in the feed water tank 110 to the simulated steam boiler 130, and has a diaphragm pump (model number "EFIC-15VC" available from IWAKI Co. Ltd.) 121 for sending formula water and a degasifier 122 in this order. The degasifier 122 is a small-sized machine equivalent to a degasifier (model "DOR") manufactured by MIURA CO., LTD., and is provided for removing dissolved oxygen in formula water. The piping portion of the water supply path 120 was formed by using a stainless tube (made of SUS304) having an inner diameter of 4 mm and an outer diameter of 6 mm except that the anterior and posterior parts of the diaphragm pump 121 were formed from a soft vinyl chloride hose.

Figure 4:
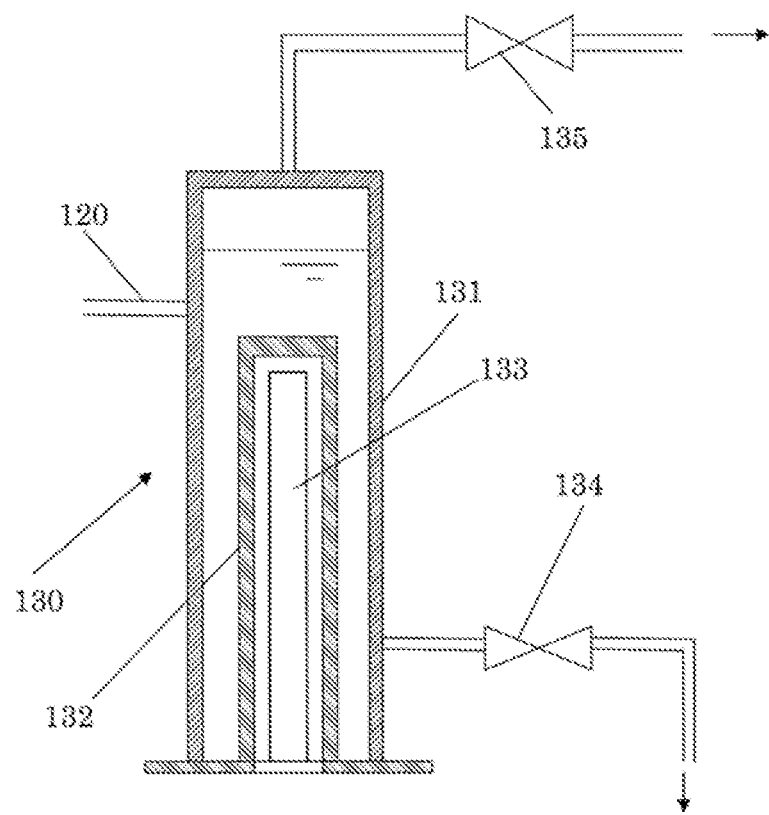
FIG. 4 is a sectional schematic view of a simulated steam boiler used in the simulated steam boiler apparatus.

As shown in FIG. 4, the simulated steam boiler 130 has a housing 131 to which the water supply path 120 communicates, a test piece 132 and a heater 133. The housing 131 is a cylindrical member of SUS304 having a closed upper end, and has a blow valve 134 in its bottom part, and a steam extraction valve 135 in its upper end. The test piece 132 has such a structure that one end of an STGP steel tube of 15A× 200 mm is closed with a lid of SS400, and a flange of SS400 having a diameter of 60 mm is welded to the other end, and the closed end is inserted into the housing 131, and the flange closes the opening of the lower end of the housing 131. As a result, a space capable of retaining feed water is ensured in the housing 131. Before the experiment, the surface of the test piece 132 was ground by #400, and degreased using acetone and methanol. The heater 133 is a cartridge heater (output 2.1 kW) manufactured by Watlow in the form of a cylinder having a diameter of 12.6 mm and a length of 150 mm, and is inserted into the test piece 132.

(Experiment)

In the feed water tank 110, 200 L of Formula water 1 was reserved, and the simulated steam boiler apparatus 100 was operated for 48 hours while blowing was conducted intermittently to satisfy the following conditions.

<Condition>

Water retention amount in housing 131: 240 mL
Operation pressure: 0.5 MPa
Corresponding evaporation: 1.6 kg/h
Condensation rate: 10 folds At the end of the operation, 10-times condensed boiler water was collected as blow water, and the hardness ($Ca^{2+}$) thereof was examined using an ICP atomic emission spectrometer ("SPS7800" manufactured by SII nanotechnologies), to reveal that it was 4.4 mg $CaCO_3$/L. No sludge was observed in the boiler water.

Similar experiments were executed for Formula water 2 and Formula water 3, and the hardnesses ($Ca^{2+}$) at the end of the operation were examined in a similar manner, to reveal that they were 21.0 mg $CaCO_3$/L and 39.0 mg $CaCO_3$/L, respectively. Also in these cases, no sludge was observed in the boiler water. According to this result, in the boiler water of formula water 2 and the boiler water of formula water 3, solubility of hardness ($Ca^{2+}$) increased by 16.6 mg $CaCO_3$/L and 34.6 mg $CaCO_3$/L, respectively, as compared to the boiler water of Formula water 1. The relation between the concentration in terms of EDTA (x) of formula water and the increase in solubility of hardness (y) is shown in FIG. 5.

Figure 5:
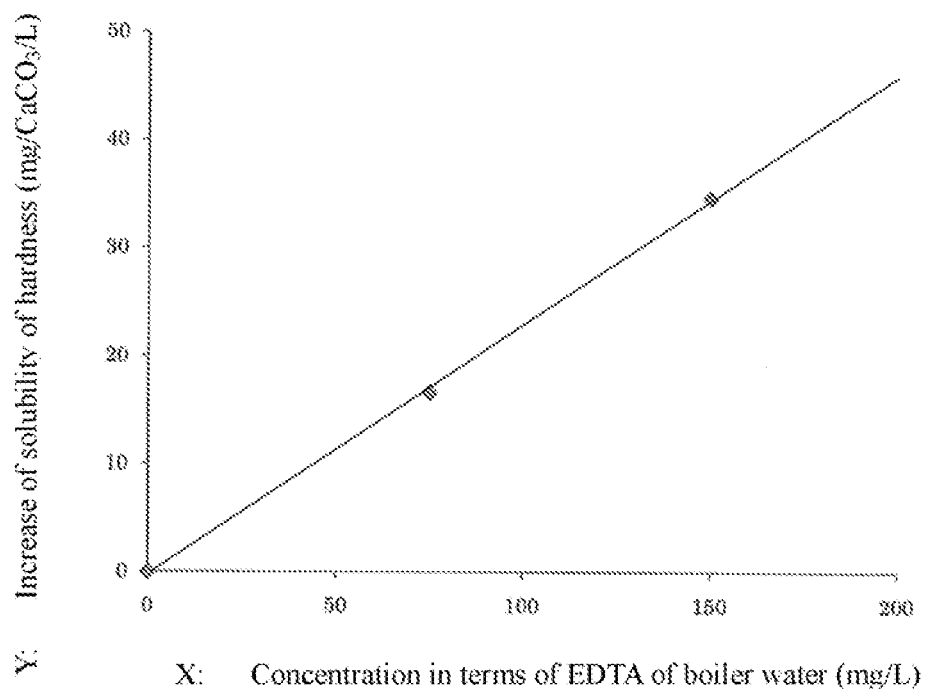
FIG. 5 is a view showing the relation between the concentration in terms of EDTA of boiler water and the increase in solubility of hardness, which is prepared based on the results of example.

According to FIG. 5, the concentration in terms of EDTA (x) and the increase in solubility of hardness (y) have a linear relationship with a gradient of 0.2288 (y=0.2288x). The molecular weight of ethylenediamine tetraacetate (EDTA) is 292.24. These demonstrate that 1 mol of EDTA-2Na blocks 0.668 mol 00.2288/100)÷(1/292.24)=0.668 mol) of hardness, and thus about 1.5 times or more mol is required to block hardness of 1 mol.

What is claimed is:

1. A method of operating a steam boiler generating a steam by heating boiler water, comprising the steps of:

preparing a feed water by softening tap water, industrial water, or ground water to a total hardness less than or equal to 5 mg/L (as $CaCO_3$) using a cation exchange resin, heating the boiler water in the steam boiler while supplying the feed water having the total hardness less than or equal to 5 mg/L (as $CaCO_3$) used as the boiler water to the steam boiler and appropriately disposing of part of the boiler water, and supplying a chemical aqueous solution containing an alkaline metal silicate, an alkaline metal hydroxide, and at least one of ethylenediamine tetraacetate and an alkaline metal salt thereof, to the feed water having the total hardness less than or equal to 5 mg/L (as $CaCO_3$) so that through controlling an amount of the chemical aqueous solution added to the feed water based on the total hardness of the feed water, an amount of the feed water flowing, and a concentration of a scale preventive agent in the chemical aqueous solution, an amount of ethylenediamine tetraacetate found in the boiler water within the steam boiler is adjusted to 4.38 mg or more for 1 mg of the hardness components ($CaCO_3$ equivalent), the steam boiler is formed as a boiler of once-through type, which includes a multiple heat transfer pipe made of nonpassivated metal between a lower header and a upper header, the lower header is supplied with the feed water that includes the chemical aqueous solution and the multiple heat transfer pipe is heated by a combustion device, the chemical aqueous solution is adjusted to a concentration of the alkaline metal silicate is between 0.01% to 60% by weight, a concentration of the alkaline metal hydroxide is between 0.1 to 30% by weight, and the concentration of the scale preventive agent is between 0.1% to 30% by weight, in the steam boiler, a condensation rate of the boiler water is set so that the concentration of the scale preventive agent in the boiler water is a predetermined concentration or less as an ethylenediamine tetraacetate equivalent.

2. The method of operating the steam boiler according to claim 1, wherein the alkaline metal silicate is a reaction product of at least one of silicic acid and silicon dioxide, and the alkaline metal hydroxide.

3. The method of operating the steam boiler according to claim 1, wherein the condensation rate of the boiler water is set so that the concentration of the scale preventive agent in the boiler water is less than or equal to 40 mg/L as the ethylenediamine tetraacetate equivalent.

4. The method of operating the steam boiler according to claim 1, further comprising the steps of, supplying steam made by the steam boiler to a loading device, separating condensed water from the steam that has passed through the loading device using a steam trap, and mixing the condensed water with the feed water prepared from the softening tap water, industrial water, or ground water.

* * * * *